(12) United States Patent
Barron

(10) Patent No.: US 12,534,071 B2
(45) Date of Patent: Jan. 27, 2026

(54) AUTOMATICALLY DEPLOYABLE VEHICLE SAFETY GUARD

(71) Applicant: PUBLIC TRANSPORTATION SAFETY INT'L CORP., Los Angeles, CA (US)

(72) Inventor: Mark B. Barron, Bel Air, CA (US)

(73) Assignee: Public Transportation Safety Int'l Corp.

( * ) Notice: Subject to any disclaimer, the term of this patent is extended or adjusted under 35 U.S.C. 154(b) by 32 days.

(21) Appl. No.: 18/294,597

(22) PCT Filed: Aug. 17, 2022

(86) PCT No.: PCT/US2022/040552
§ 371 (c)(1),
(2) Date: Feb. 2, 2024

(87) PCT Pub. No.: WO2023/023120
PCT Pub. Date: Feb. 23, 2023

(65) Prior Publication Data
US 2025/0115237 A1   Apr. 10, 2025

Related U.S. Application Data

(60) Provisional application No. 63/289,334, filed on Dec. 14, 2021, provisional application No. 63/234,453, filed on Aug. 18, 2021.

(51) Int. Cl.
*B60W 30/09* (2012.01)
*B60Q 5/00* (2006.01)
(Continued)

(52) U.S. Cl.
CPC ............ *B60W 30/09* (2013.01); *B60Q 5/006* (2013.01); *B60Q 9/008* (2013.01); *B60R 19/54* (2013.01);
(Continued)

(58) Field of Classification Search
CPC ... B60R 21/34; B60R 21/01512; B60R 21/20; B60R 21/01554; B60R 19/54; B60R 19/56; B60R 19/46; B60R 2021/01211
See application file for complete search history.

(56) References Cited

U.S. PATENT DOCUMENTS

| | | | |
|---|---|---|---|
| 4,093,290 A | 6/1978 | Pearson | |
| 4,249,632 A | 2/1981 | Kramer | |
| (Continued) | | | |

FOREIGN PATENT DOCUMENTS

| | | | |
|---|---|---|---|
| CN | 110001564 | 7/2019 | |
| EP | 2589515 A1 | 5/2013 | |
| (Continued) | | | |

*Primary Examiner* — Hai H Huynh
*Assistant Examiner* — Johnny H Hoang
(74) *Attorney, Agent, or Firm* — Everett G. Diederiks, Jr.

(57) ABSTRACT

A safety guard is configured to extend below a body of a vehicle for engaging animate and inanimate objects in order to prevent the objects from going under the vehicle. A detection system is provided, including a plurality of sensors configured to sense objects about the vehicle, and a controller for analyzing for the possibility of at least an animate object going under the vehicle. The analysis can result in repositioning of the safety guard from a raised, retracted position during normal operation of the vehicle to a lowered, deployed position in establishing a physical barrier spaced from a road surface a distance which prevents animate objects from entering under the vehicle. The analysis can also result in the issuance of an audible or visual warning and/or the automatic control of at least one other vehicle control system.

20 Claims, 5 Drawing Sheets

(51) Int. Cl.
*B60Q 9/00* (2006.01)
*B60R 19/54* (2006.01)
*B60R 19/56* (2006.01)
*B60R 21/34* (2011.01)
*B60W 10/18* (2012.01)
*B60W 10/22* (2006.01)
*B60W 10/30* (2006.01)

(52) U.S. Cl.
CPC .............. *B60R 19/56* (2013.01); *B60R 21/34* (2013.01); *B60W 10/18* (2013.01); *B60W 10/22* (2013.01); *B60W 10/30* (2013.01); B60W 2420/403 (2013.01); B60W 2420/408 (2024.01); B60W 2710/18 (2013.01); B60W 2710/22 (2013.01)

(56) References Cited

U.S. PATENT DOCUMENTS

| | | |
|---|---|---|
| 4,300,116 A | 11/1981 | Stahovec |
| 4,688,824 A | 8/1987 | Herring |
| 4,779,095 A | 10/1988 | Guerreri |
| 4,877,266 A | 10/1989 | Lamparter |
| 4,956,630 A | 9/1990 | Wicker |
| 5,132,662 A | 7/1992 | Birch |
| 5,313,189 A | 5/1994 | Dodd |
| 5,462,324 A | 10/1995 | Bowen |
| 5,735,560 A | 4/1998 | Bowen |
| 6,007,102 A | 12/1999 | Helmus |
| 6,601,669 B1 | 8/2003 | Agnew |
| 6,814,378 B1 | 11/2004 | Marmur |
| 7,905,314 B2 | 3/2011 | Mathevon |
| 8,505,943 B2 | 8/2013 | Barron |
| 8,567,802 B2 | 10/2013 | Barron |
| 8,602,466 B2 | 12/2013 | Barron |
| 9,102,290 B1 | 8/2015 | Cuddihy |
| 9,365,176 B2 | 6/2016 | Revankar |
| 9,457,748 B1 | 10/2016 | Kaufmann |
| 9,676,367 B2 * | 6/2017 | Barron .................... B60R 19/54 |
| 10,118,585 B2 | 11/2018 | Barron |
| 10,207,672 B2 | 2/2019 | Barron |
| 10,457,340 B2 | 10/2019 | Potvin |
| 10,486,592 B2 | 11/2019 | Irby |
| 10,696,253 B2 * | 6/2020 | Barron .................... B60R 19/54 |
| 2007/0067081 A1 * | 3/2007 | Ton ........................ B60Q 9/008 701/41 |
| 2011/0018289 A1 * | 1/2011 | Barron .................... B60R 21/34 293/58 |
| 2012/0248799 A1 * | 10/2012 | Barron .................... B60R 19/54 293/58 |
| 2016/0031409 A1 | 2/2016 | Barron |
| 2018/0056926 A1 | 3/2018 | Barron |
| 2020/0023796 A1 | 1/2020 | Barron |
| 2021/0246708 A1 | 8/2021 | Mönig |

FOREIGN PATENT DOCUMENTS

| | | |
|---|---|---|
| GB | 201818810 | 6/2020 |
| IT | 201900006230 A1 | 10/2020 |
| JP | 2005138750 | 6/2005 |
| JP | 2005329833 | 12/2005 |
| KR | 19980046535 | 9/1998 |
| KR | 101082112 | 11/2011 |
| KR | 101801179 | 12/2017 |
| TW | I707794 | 10/2020 |
| WO | 9420333 | 9/1994 |
| WO | WO2018039140 A1 | 3/2018 |
| WO | 2023287965 | 1/2023 |

* cited by examiner

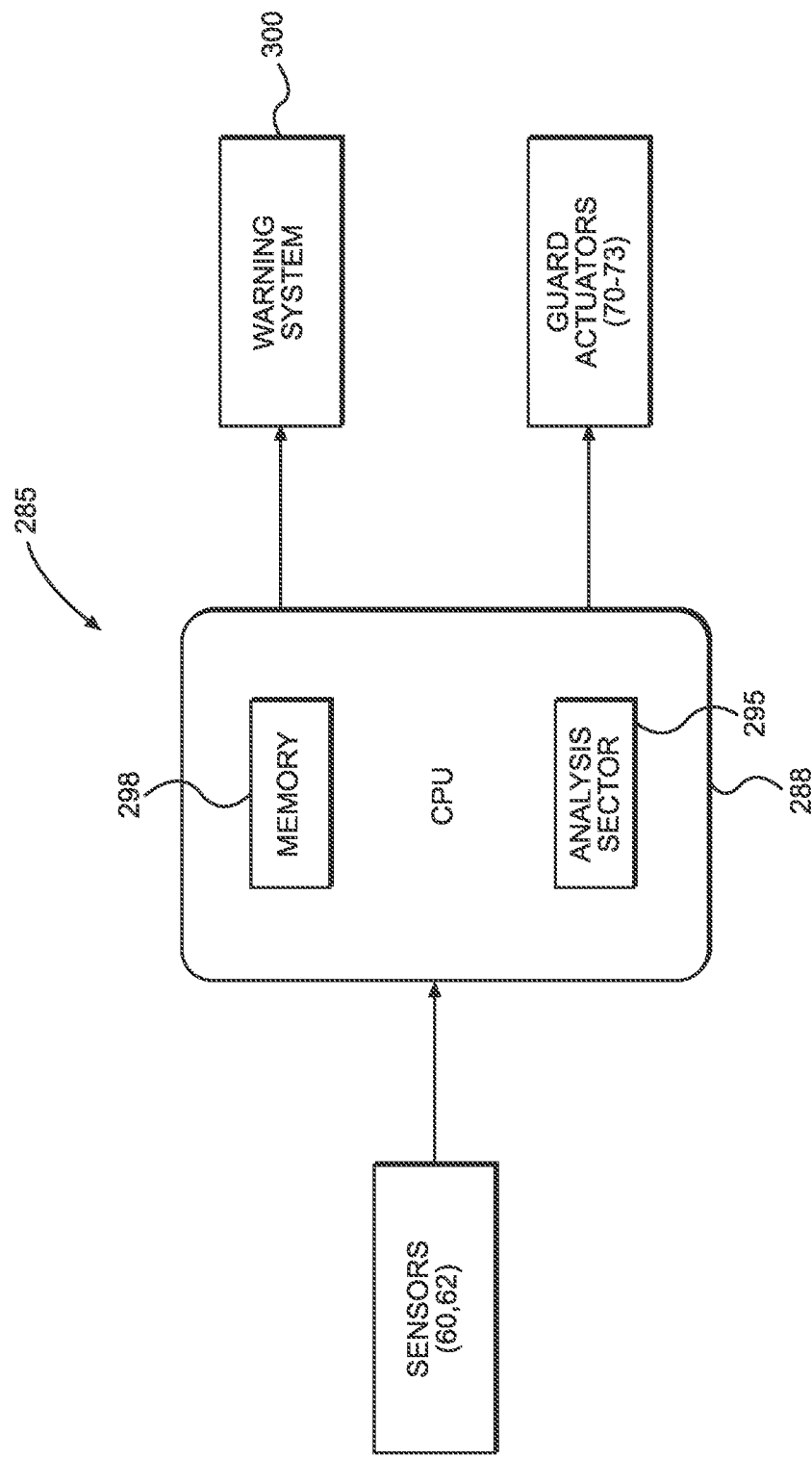

AUTOMATICALLY DEPLOYABLE VEHICLE SAFETY GUARD

CROSS-REFERENCE TO RELATED APPLICATIONS

This application represents the U.S. National Phase of International Application number PCT/US2022/040552, entitled "Automatically Deployable Vehicle Safety Guard" and filed on 17 Aug. 2022, claiming benefit to U.S. Provisional Patent Application No. 63/234,453 filed 18 Aug. 2021, and U.S. Provisional Patent Application No. 63/289,334 filed 14 Dec. 2021, all of which are incorporated herein by reference.

BACKGROUND OF THE INVENTION

Field of the Invention

The present invention pertains to the art of vehicle safety devices and, more particularly, to a safety guard system including one or more safety guards mounted to and extending downward from one or more portions of a vehicle for engaging animate and inanimate objects in order to prevent the objects from going under the vehicle. Overall, the safety guard system includes a guard portion which is normally arranged in a retracted position, but which will be automatically lowered based on sensed conditions to an actuated position wherein the guard portion can effectively deflect an animate and inanimate object away from the vehicle.

Discussion of the Prior Art

For a range of reasons, various transportation vehicles are designed with rather high ground clearances. For instance, school and commuter buses, as well as personal recreation vehicles, can have associated high ground clearances. Unfortunately, there are inherent dangers associated with the operation of vehicles with high ground clearances that are not found in other vehicles which have low ground clearances. The most serious of these injuries is a result of an individual slipping and falling in the road in front of the vehicle, resulting in the vehicle running over the individual. In addition, certain inanimate objects can undesirably be run over and crushed by such a vehicle.

To address these concerns, it has been proposed in the art to mount a safety guard directly in front of wheels on a bus to establish a safety barrier between the wheels and objects. More specifically, as represented by U.S. Pat. Nos. 5,462,324 and 5,735,560, it is known to mount a safety barrier to undercarriage structure of a vehicle, such as a bus, with the safety barrier including a lower edge extending directly along a ground surface. The safety barrier is fixedly supported at various locations, such as to axle, frame and/or suspension structure. The safety barrier is angled such that, if an object is encountered during movement of the bus, the safety barrier forces the object out from under the vehicle to a position out of the path of the vehicle wheels.

Known safety guards are generally fixed in place, while others are resiliently mounted. In either case, the safety guards extend above a road surface by no more than a few inches during normal operation of the vehicle. Although this height is effective for the desired deflection function, this positioning subjects the safety guards to various detrimental environmental conditions. For instance, this low position exposes such a safety guard to potential abrasions and wear due to the engagement with fixed objects such as curbs, road surfaces around potholes, speedbumps and the like during regular operation of the vehicle. In addition, depending at least in part on the design of the safety guard and its environment of use, the safety guard can undesirably collect slush, ice, mud or the like making for a visually unappealing attribute. Based on the above, there is seen to exist a need for a safety guard system which exhibits enhanced mounting and operation for guard protection and overall vehicle aesthetic purposes while still performing the main function of being positioned to prevent animate objects from becoming positioned under the vehicle.

SUMMARY OF THE INVENTION

The present invention is directed to providing a vehicle safety guard system mounted to and extending downward from select body portions of a vehicle, such as a high clearance school or commuter bus or a personal recreational vehicle, wherein the safety guard is automatically movable between a retracted position during normal operation of the vehicle and an extended position wherein the safety guard functions to prevent animate objects from going under the vehicle. Overall, the safety guard functions to engage and deflect individuals or other animate objects lying in the path of the vehicle, thereby preventing the individuals or other animate objects from being run over by the vehicle. For this purpose, the safety guard, when deployed, extends down from a body portion of the vehicle, such as below the front bumper and/or between the front and rear wheels along a side of the vehicle, to just above the vehicle support surface, e.g., in the range of about 3 inches or less from the support surface.

In accordance with the invention, the safety guard is shiftable from a retracted position just slightly above, just at, or slightly below the body portion of the vehicle so as to, at most, only be slightly visible, e.g., from an elevational side view of the vehicle, during normal operation of the vehicle to an extended position, i.e., a lowered, operational position just above the vehicle support surface whereat the safety guard can effectively prevent an animate and/or inanimate object from going under the vehicle body. This vertical shifting can be performed through various motions, including linear, pivoting, unreeling, body extension and the like. This vertical movement is performed automatically based on signals from sensors used to assess objects adjacent the vehicle.

More specifically, the vertical adjustment is performed by a computerized monitoring system which functions to evaluate the environment directly adjacent the vehicle. To this end, the vehicle incorporates sensors, such as cameras, radar, sonar, laser and/or other known sensing units, with signals from the sensors being analyzed to determine the existence of an animate object, i.e., a person or animal, either alone or in conjunction with an inanimate object, e.g., a bicycle, scooter, stroller or the like. When an animate object is sensed to eminently breach a predefined spatial perimeter about the vehicle, either at the front or side of the vehicle, the one or more portions of the overall safety guard system is automatically lowered to an effective object deflecting position. When the object is no longer present near the vehicle or after a predetermined time period, the safety guard automatically raises to its normal, retracted operational height.

In connection with sensing the existence of the animate object, the various sensors form part of a monitoring and controlling system, with signals from the sensors being continually fed to a controller or CPU which includes an analyzing sector that can distinguish between an animate object, either alone or with an inanimate object, which would warrant the automatic deployment of the safety guard versus various other inanimate objects which may be customarily driven by during normal use of the vehicle. In one preferred embodiment, AI is employed to compare signal data, such as camera images, with stored data imagines to indicate the presence of an animate object and the need to temporarily deploy the safety guard. In another preferred embodiment, radar is employed for object sensing.

With this overall construction, an individual who slips and falls near the vehicle or in the vehicle's path will be sensed, the safety guard will be timely deployed and the individual will engage the safety guard and be prevented from going under the vehicle. Also advantageous in connection with the invention is, since the safety guard will more often be in the raised or retracted position, the safety guard will be far less likely to engage any inanimate object, fixed or otherwise, which could cause damage to the safety guard during operation of the vehicle.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIG. 5 is a block diagram of a system for controlling the vertical movement of the safety guard.

DETAILED DESCRIPTION OF THE INVENTION

Figure 1:
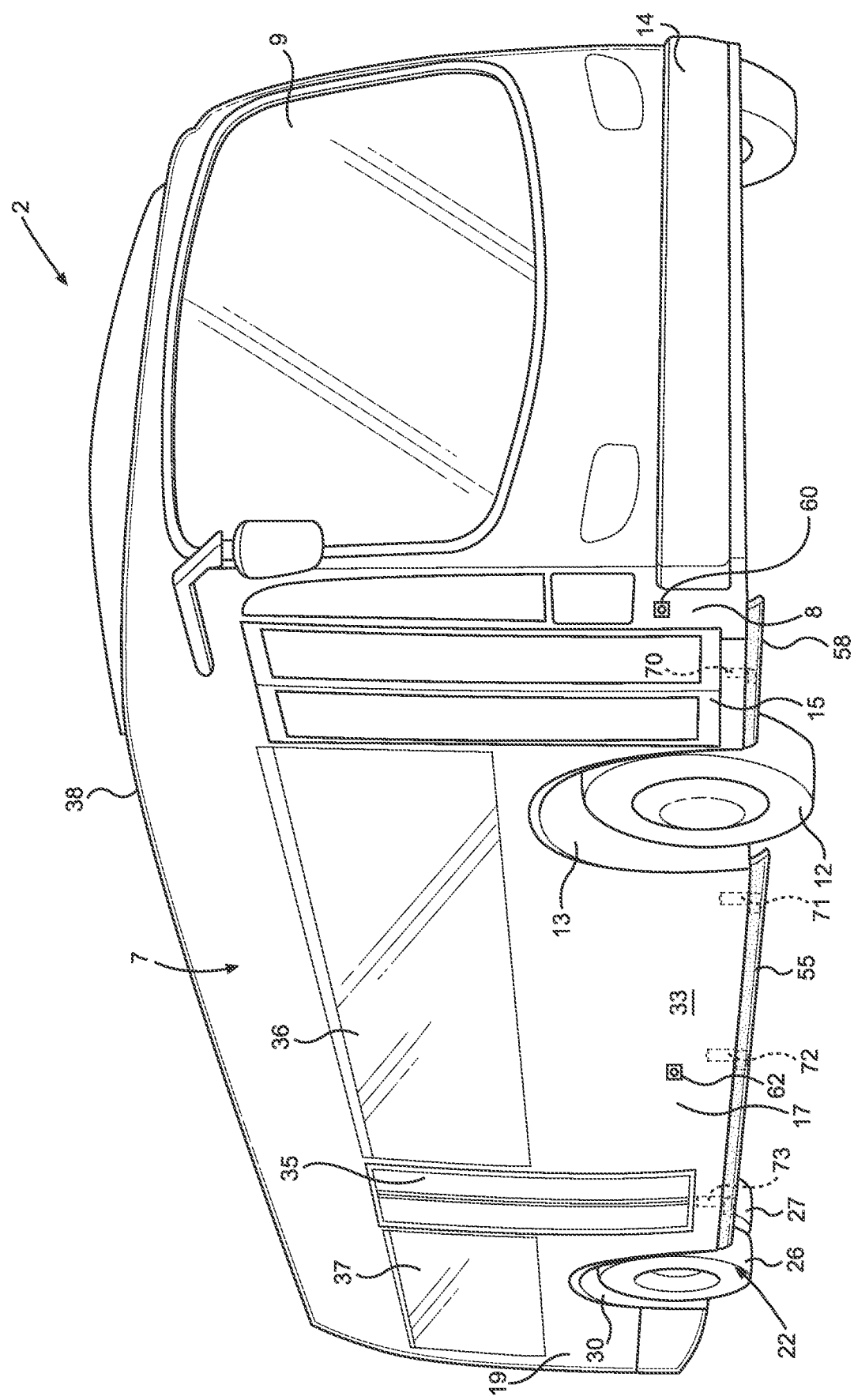
FIG. 1 is a perspective view of a commuter bus-type vehicle having mounted thereto a safety guard system in accordance with an embodiment of the invention shown in a retracted or undeployed position.

With initial reference to FIG. 1, a vehicle 2, shown as a commuter bus, including a body 7 having a front end 8 having a windshield 9, front steerable wheels, one of which is shown at 12 within a wheel well 13, and a front bumper 14. Arranged directly forward of front wheel 12 is shown a forwardmost side door 15. Body 7 also includes a middle section 17 and a rear end section 19. Supporting rear end section 19 is a pair of rear wheel assemblies, one set of which is shown at 22 to include dual wheels 26 and 27 arranged in a wheel well 30 created in a side panel 33 of vehicle body 7. Just in front of rear wheel assembly 22 alongside panel 33 is a rearmost side door 35. Also provided in side panel 33 are various fore-to-aft spaced windows 36 and 37 which are vertically arranged below a roof 38. In accordance with the present invention, vehicle 2 includes one or more safety guards which are, at the very least, vertically adjustable. More specifically, in the exemplary embodiment shown in FIG. 1, at least one side safety guard 55 extends below side panel 33 between front and rear wheels 12 and 22. In this figure, safety guard 55 is located in a retracted position wherein safety guard 55 is just below side panel 33 so as to be only slightly visible from an elevational side view of vehicle 2 during normal operation of vehicle 2. This position is considered advantageous in at least two regards, i.e., vehicle 2 can be readily identified as having the safety guard and, as safety guard 55 can be lowered as detailed fully below, the lowering travel distance and time are reduced. However, safety guard 55 could be located completely behind side panel 33 or under vehicle 5 when in the retracted, normal vehicle operating position without departing from the invention. In the embodiment shown, by way of example, safety guard 55 is arranged at approximately two (2) inches below side panel 33.

At this point, it should be noted that, although the invention is being described with reference to safety guard 55 extending alongside panel 33 of vehicle 2, other safety guard arrangements could be employed. Clearly, a separate side safety guard section 58 can be provided just below door 15 and, although not shown, a frontal safety guard section could be provided below bumper 14. However, for purposes of understanding the invention, only safety guard 55 and its operation will be discussed further below in connection with this disclosed embodiment. Although also applicable to more low riding buses, the safety guards of the invention are considered to be particularly advantageously employed in connection with vehicles which have undercarriage body portions that are raised quite high, such as many school, commuter, cross-country and recreational buses/vehicles. In rather high ground clearance vehicles, like vehicle 2, the ground clearance of bumper 14 can be even up to two feet, while the one or more safety guards in accordance with the invention reduces this distance to in the order of 2-6, and preferably about 2-3 inches. In most preferred embodiments, the safety guards are formed of a highly durable, impact resistant urethane material that is abrasion resistant, corrosion proof, smooth to the touch and color fast, although other known materials, including plastic, rubber and the like, could be used to create a physical barrier strong enough to prevent an animate object, e.g., child, adult, dog or cat, or an inanimate object, e.g., a bicycle, skateboard, dolly, stroller or the like, from going under body 7. In addition, it would be possible to manufacture at least a portion of a safety guard from recycled tire rubber or fiberglass. To reduce the weight and thickness of the safety guard, it is possible to employ an inner wire mesh for internal strengthening without sacrificing overall effectiveness.

Again, it should be recognized that one or more safety guards can be mounted to and extend downward from different portions of vehicle 2 for engaging animate and inanimate objects in order to prevent the objects from going under vehicle 2. With reference specifically back to safety guard 55, it should be noted that safety guard 55 extends below side panel 33 essentially entirely between wheel wells 13 and 30 of front and rear wheels 12 and 22 respectively. Therefore, safety guard 55 protects the entire area leading to door 35. Regardless, for purposes of the invention, one or more of safety guards can be provided and each guard can actually be formed of one or more pieces. The particular mounting of the one or more safety guards can greatly vary in accordance with the present invention, while preferably accommodating the vertical shifting configuration alluded to above. Before turning FIG. 2 in explaining further details of the invention, the inclusion of sensors, such as sensors 60 and 61 provided at spaced locations alongside panel 33, are referenced. Sensors 60 and 61 can take various forms, such as cameras, radar, sonar, laser or other known sensing units, and are provided in connection with the preemptive sensing of an animate or inanimate object moving toward vehicle 2 as further detailed below.

Figure 2:
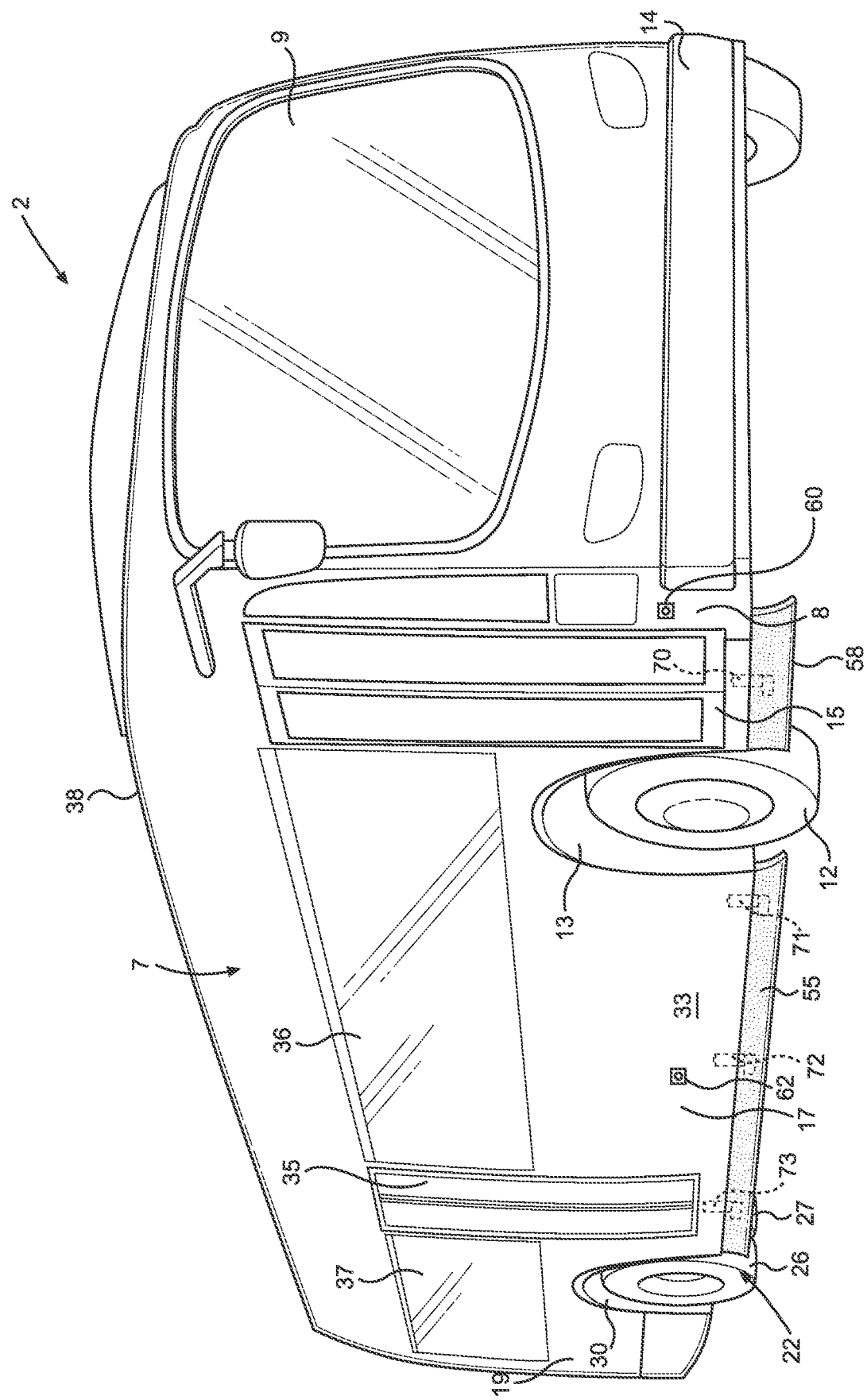
FIG. 2 is a perspective view of the vehicle of FIG. 1 with the safety guard system in an actuated or deployed position.

With specific reference to FIG. 2, safety guard 55 is shown in an extended or deployed position wherein safety guard 55 has been shifted vertically to the position referenced above of approximately 2-3 inches above the surface over which vehicle 2 travels. The repositioning of safety guard 55 from the retracted position shown in FIG. 1 to the extended, deployed position of FIG. 2 can be carried out with various type of actuators, such as generically indicated at 70-73. Preferably, pneumatic, hydraulic, electrical, magnetic, servo or the like type actuators 70-73 are used. The actual path traversed by safety guard 55 can also vary, such as from a substantially vertical only movement to an angular or pivoting movement. In addition, safety guard 55 can be biased to one or more of these positions, i.e., spring loaded. Therefore, it should be readily recognized that different mounting/actuator arrangements could be employed while still accommodating the desired movement. In any case, it is important to recognize that safety guard 55 basically establishes, once deployed, a barrier in the form of a skirt or other physical barrier extending between front and rear wheels 12 and 22.

Figure 3:
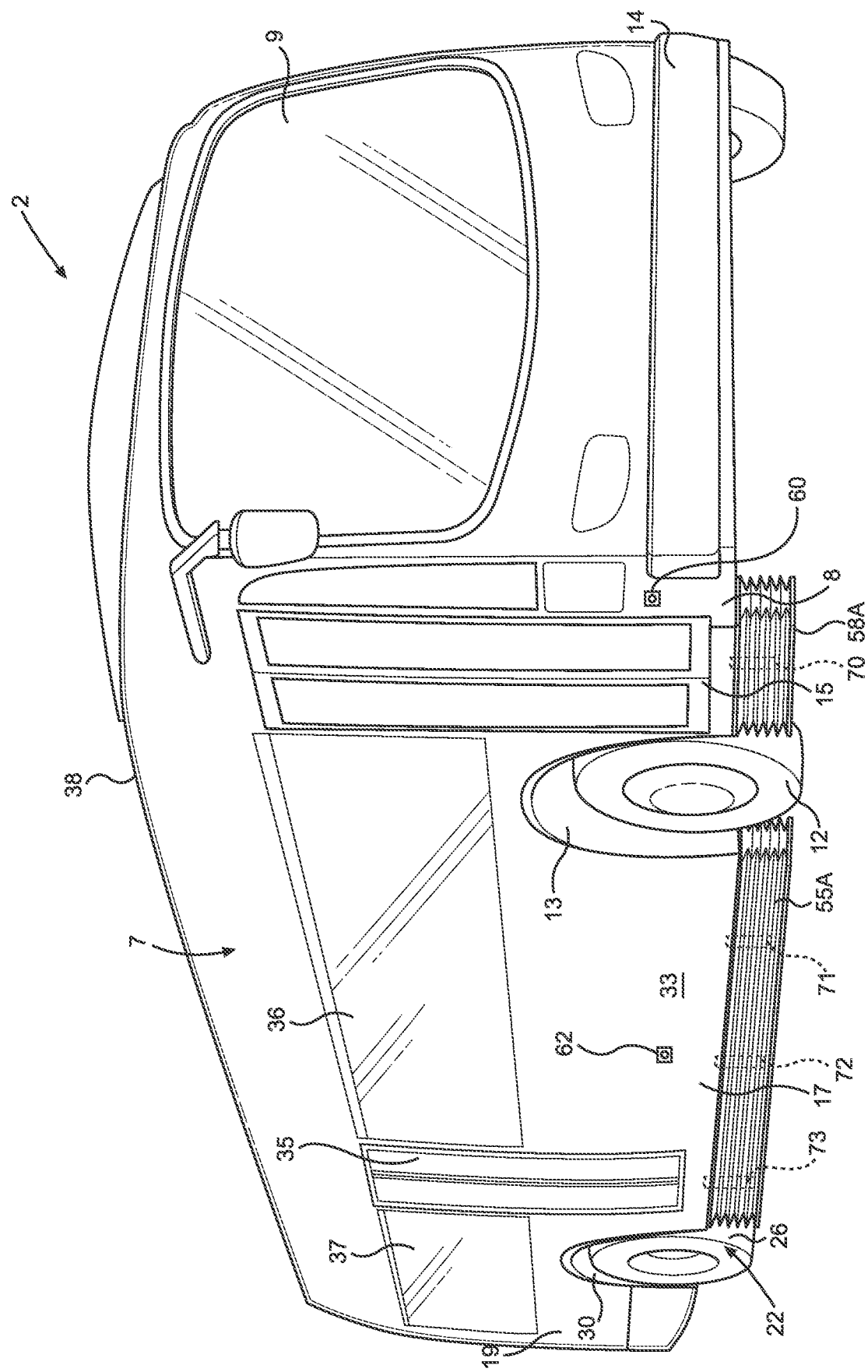
FIG. 3 is a perspective view of a commuter bus-type vehicle having mounted thereto a safety guard system constructed in accordance with another embodiment of the invention.

As indicated above, the safety guard of the invention can take different forms. For further illustrative purposes, FIGS. 3, 4A and 4B will now be referenced in describing another embodiment of the invention, with like reference numerals referring to corresponding parts to the embodiment of FIGS. 1 and 2, as well as in the several additional views provided. Basically, in accordance with this embodiment, a safety guard 55A extends between front and rear wheels 12 and 26, while a safety guard 58A extends below door 15 and about a corner portion at front end 8. The embodiment of these figures is intended to illustrate that the safety guard sections can take extensible forms, such as by employing an accordion-style or bellows construction as shown. Like the embodiment described above, various actuators, e.g., actuators 70-73, can be used to shift the safety guard sections between extended and retracted positions.

Figure 4A:
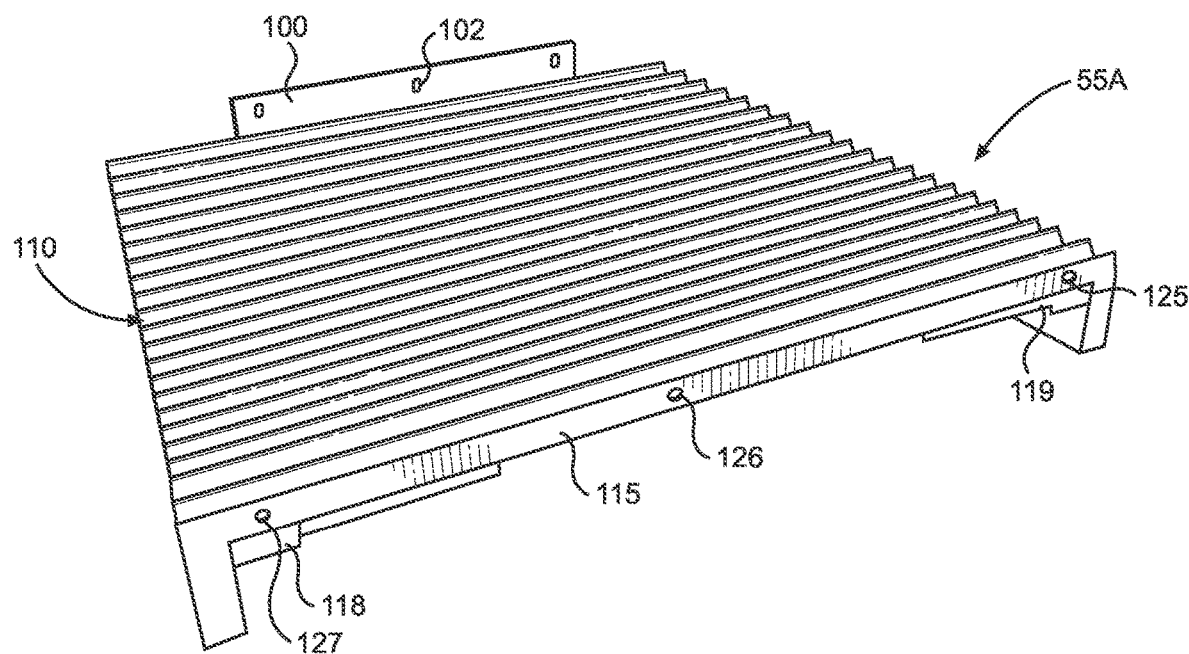
FIG. 4A shows a portion of the safety guard system of FIG. 3 detached from the vehicle.
Figure 4B:
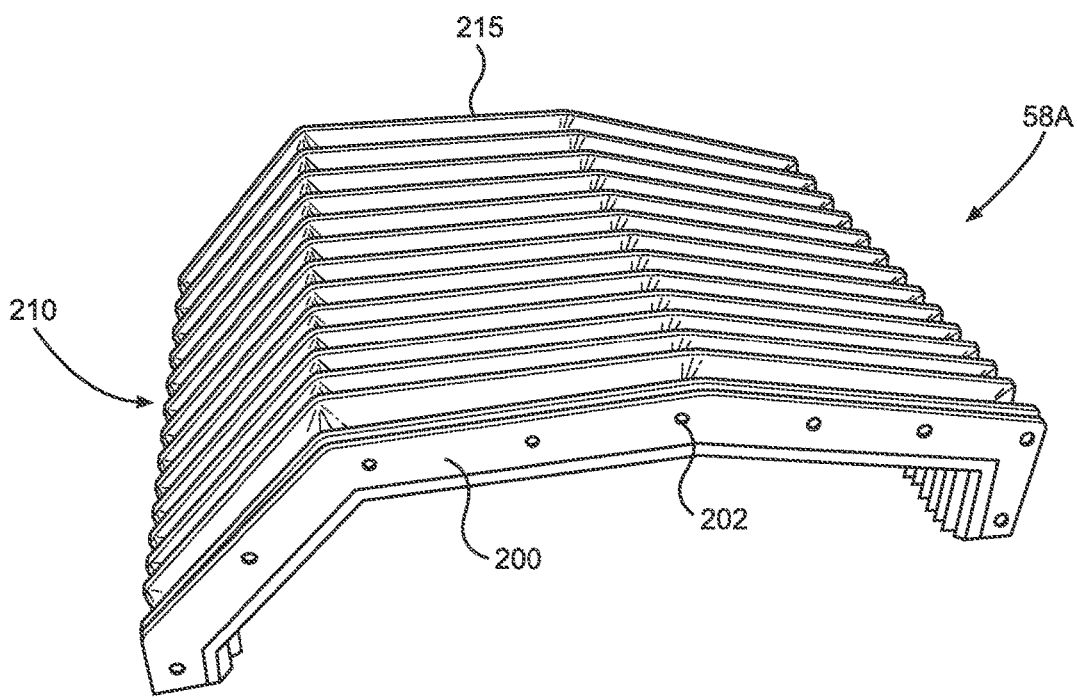
FIG. 4B shows another portion of the safety guard system of FIG. 3 detached from the vehicle.

FIG. 4A particularly shows structure associated with safety guard 55A, including a vehicle mounting plate or portion 100 having various spaced holes 102 for securing safety guard 55A to the frame, side rocker panel or the like with bolts (not shown). Safety guard 55A also includes a pleated body portion 110 leading to a base 115 which is structurally reinforced by gusset members 118 and 119. Base is formed with various holes 125-127 for the attachment of actuators 71-73 respectively. In a similar manner, as shown best in FIG. 4B, safety guard 58A includes a vehicle mounting portion 200 provided with a series of mounting holes 202, a pleaded, accordion or bellows style body portion 210 and a base 215. In a preferred form of the invention, each of safety guards 55A and 58A are molded, e.g., of urethane, plastic, rubber or the like, so as to be readily shaped to the contours of the particular vehicle 2. Unlike the embodiment of FIGS. 1 and 2, the ability of body portions 110 and 210 to extend and retract relative to vehicle mounting portions 100 and 200, respectively, provides for both an aesthetically pleasing flush mount with side panel 33 and the corner of front portion 8, and the ability to establish a more universal mounting arrangement to a wide range of vehicles.

The vertical shifting associated with safety guards 55, 55A, 58 and/or 58A could potentially be performed selectively by an operator of vehicle 2 but, in accordance with the invention, is preferably performed automatically based on sensory input as will now be described in detail with particular reference to FIG. 5. As schematically depicted, a control system for determining and assessing the potential for an animate or inanimate object of concern possibly leading to falling or becoming lodged under vehicle 2 is generally shown at 285 in FIG. 5. As illustrated, control system 285 includes a controller or CPU 288 mounted on vehicle 2. The functions performed by controller 288 can be combined into a main vehicle controller, linked to the same or be separate therefrom, and actually can be integrated, at least in part, into the safety guard itself. In any case, controller 288 receives signals from sensors 60 and 62 which, as indicated above, can be cameras, but can also take other forms such as radar units. In any case, the sensors 60, 62 are preferably activated to input information to controller 288 whenever vehicle 2 is in operation, such as whenever the engine of vehicle 2 is running or when the vehicle is moving.

In addition to all of the sensor information preferably being stored in memory 298 of controller 288 for potential later review, the sensor signals are also provided to an analysis sector 295 of controller 288. Analysis sector 295 functions to determine if a potentially dangerous situation is imminent, particularly whether an individual is moving toward or closer to vehicle 2 which could present a situation wherein the individual could fall under vehicle 2. If it is determined that such a situation is even potential, controller 288 controls guard actuators 70-73 to automatically shift the safety guard from the raised or retracted position of FIG. 1 to the lowered or deployed position of FIG. 2 (or FIG. 3 in accordance with the second embodiment shown), thereby establishing a physical barrier which is spaced from the road surface a distance which simply prevents anyone from entering under vehicle 2 and potentially being run over by wheels 26 and/or 27. Preferably, once lowered, the safety guard remains in the lowered position until both the area is determined to be clear of a potential hazard based on analyzed sensor signals and a predetermined lowering time period, e.g., 2-3 minutes, has lapsed. In addition to lowering the safety guard, a visual and/or audible warning can be produced through warning system 300 to the vehicle operator and/or people in the vicinity around vehicle 2, such as through an illuminating warning (caution) sign on side of vehicle 2 (not shown) and/or audible message. In further accordance with the invention, particularly in connection with the use of camera sensors, analysis sector 95 can differentiate between animate and inanimate objects, as well as between different inanimate objects, e.g., curbs, potholes and speed bumps versus bicycles, skateboard and strollers, based on stored comparative data and/or using AI or machine learning, in order to determine the deployment strategy. In connection with the transfer of data/information, the transmissions can be wired or wireless.

Based on the above, it should be readily apparent that the invention establishes a physical barrier or guard mounted to the undercarriage, body, frame, chassis, etc. of a vehicle which is vertically shiftable to automatically close a potentially dangerous gap from below a body panel of the vehicle to a road surface to prevent pedestrians, cyclists, animals and the like from entering the undercarriage of the vehicle in order to prevent injury or fatalities caused by the person or animal being run over by the front or rear wheels. Important to the invention, the safety guard is normally in a raised position and a combination of sensors and a controller are used to automatically lower the safety guard in an immediate, preemptive manner based on the evaluation of a given, imminent situation. The sensors could be mounted directly to the vehicle body or actually embedded in the guard. Provisions could also be made to allow the vehicle operator to separately control repositioning the guard, with the controller overriding any raising selection as needed. The warning (e.g., alert sounds, notifications, announcements, etc.) can be extended to passengers as well when the safety guard is lowered, since the obstruction may alter ride comfort which could easily be forewarned. In this context, the controller can also be linked to other vehicle control systems, such as air bags, adjustable suspension components, braking system and the like, in order to potentially control other vehicle functions depending on the speed of the vehicle when the safety guard needs to be deployed. When raised, the safety guard is in a better position to avoid potential damage from a vehicle impact with fixed inanimate objects such as curbs, potholes and the like, resulting in less abrasions and wear due to road and environment of use conditions. In addition, since the safety guard will more often be in the raised or retracted position, the excess collection of undesirable slush, ice, mud or the like on the safety guard is avoided.

The invention claimed is:

1. A vehicle comprising:
   a body having a front end portion and a side panel portion;
   a pair of front steerable wheels spaced in a transverse direction of the body of the vehicle;
   at least one pair of transversely spaced rear wheels which are longitudinally spaced from the front steerable wheels;
   a door provided along the side panel portion;
   a safety guard extending along the side panel portion for engaging animate and inanimate objects in order to prevent the objects from going under the vehicle, said safety guard being normally maintained in a raised, retracted position during operation of the vehicle and configured to be shifted to a lowered, deployed position in establishing a physical barrier which is spaced from a road surface a distance which prevents animate objects from entering under the vehicle;
   a detection system including a plurality of sensors configured to sense for a potentially dangerous situation, which could result in an animate object going under the vehicle; and
   a controller configured to cause automatic repositioning of the safety guard from the raised, retracted position to the lowered, deployed position in a preemptive manner based on signals received from the detection system.

2. The vehicle of claim 1, wherein the plurality of sensors include cameras.

3. The vehicle of claim 1, wherein the plurality of sensors include radar.

4. The vehicle of claim 1, wherein the controller is configured to differentiate between animate and inanimate objects.

5. The vehicle of claim 1, wherein the controller is configured to allow an operator of the vehicle to separately reposition the safety guard.

6. The vehicle of claim 1, wherein the controller is linked to and configured to control at least one other vehicle control system, including at least one of air bags, adjustable suspension components and a vehicle braking system, when it is determined to shift the safety guard to the lowered, deployed position.

7. The vehicle of claim 1, further comprising a warning system configured to issue at least one of an audible or visual warning when the safety guard is shifted to the lowered, deployed position.

8. The vehicle of claim 7, wherein the at least one of the audible or visual warning is configured to be presented to at least one of an operator of the vehicle, passengers of the vehicle or people in the vicinity around the vehicle.

9. The vehicle of claim 1, wherein the door is provided forward of the pair of front steerable wheels along the side panel portion and the safety guard includes a first section located along the side panel portion entirely forward of the front steerable wheels and a second section located along the side panel portion entirely between the front steerable wheels and the at least one pair of transversely spaced rear wheels.

10. The vehicle of claim 1, wherein the safety guard has an accordion-style construction.

11. A method of automatically deploying a safety guard normally maintained in a raised, retracted position during normal operation of a vehicle and configured to be shifted to a lowered, deployed position in establishing a physical barrier which extends below a side panel body portion and between front and rear wheels of the vehicle to a location spaced from a road surface over which the vehicle travels a distance which prevents animate objects from entering under vehicle, said method comprising:
   sensing for a potentially dangerous situation, which could result in an animate object going under the vehicle, with a plurality of sensors;
   analyzing signals from the plurality of sensors; and
   when the potentially dangerous situation is considered imminent, automatically repositioning the safety guard from the raised, retracted position to the lowered, deployed position in a preemptive manner.

12. The method of claim 11, wherein sensing for the potentially dangerous situation includes using at least one of cameras and radar sensors the plurality of sensors.

13. The method of claim 11, wherein analyzing signals from the plurality of sensors includes differentiating between animate and inanimate objects.

14. The method of claim 11, further comprising issuing at least one of an audible or visual warning when the safety guard is shifted to the lowered, deployed position.

15. The method of claim 14, wherein the audible or visual warning is presented to an operator of the vehicle.

16. The method of claim 14, wherein the at least one of the audible or visual warning is presented to at least one of passengers of the vehicle or people in the vicinity around the vehicle.

17. The method of claim 11, further comprising causing the safety guard to be repositioned to the lowered, deployed position directly by an operator of the vehicle.

18. The method of claim 11, further comprising automatically controlling at least one other vehicle control system, including at least one of air bags, adjustable suspension components and a vehicle braking system, when the potentially dangerous situation is considered imminent.

19. The method of claim 11, further comprising pivoting the safety guard from the raised, retracted position to the lowered, deployed position.

20. The method of claim 11, further comprising lowering the safety guard accordion-style from the raised, retracted position to the lowered, deployed position.

* * * * *